United States Patent
Sambhy et al.

(10) Patent No.: US 8,544,987 B2
(45) Date of Patent: *Oct. 1, 2013

(54) THERMALLY STABLE OLEOPHOBIC LOW ADHESION COATING FOR INKJET PRINTHEAD FRONT FACE

(75) Inventors: Varun Sambhy, Penfield, NY (US);
Kock-Yee Law, Penfield, NY (US);
Hong Zhao, Webster, NY (US);
Samarth Chugh, Germantown, MD (US)

(73) Assignee: Xerox Corporation, Norwalk, CT (US)

( * ) Notice: Subject to any disclaimer, the term of this patent is extended or adjusted under 35 U.S.C. 154(b) by 292 days.

This patent is subject to a terminal disclaimer.

(21) Appl. No.: 12/860,660

(22) Filed: Aug. 20, 2010

(65) Prior Publication Data

US 2012/0044298 A1   Feb. 23, 2012

(51) Int. Cl.
*B41J 2/14* (2006.01)
*B41J 2/16* (2006.01)
*B05D 3/02* (2006.01)
*C09D 11/00* (2006.01)

(52) U.S. Cl.
USPC ............................ 347/45; 427/379; 106/31.13

(58) Field of Classification Search
None
See application file for complete search history.

(56) References Cited

U.S. PATENT DOCUMENTS

| | | |
|---|---|---|
| 4,704,420 A | 11/1987 | Federici et al. |
| 4,863,986 A | 9/1989 | Re et al. |
| 5,305,015 A | 4/1994 | Schantz et al. |
| 5,677,406 A | 10/1997 | Tazelaar et al. |
| 5,867,189 A | 2/1999 | Whitlow et al. |
| 6,071,564 A | 6/2000 | Marchetti et al. |
| 6,821,327 B2 | 11/2004 | Jaeger et al. |
| 7,211,131 B2 | 5/2007 | Banning et al. |
| 7,622,580 B2 | 11/2009 | Banning et al. |
| 7,655,310 B2 | 2/2010 | Trombetta |
| 7,699,922 B2 | 4/2010 | Breton et al. |
| 2004/0077887 A1 | 4/2004 | Banning et al. |
| 2004/0082801 A1 | 4/2004 | Jaeger et al. |
| 2004/0167249 A1 | 8/2004 | Banning et al. |
| 2005/0074686 A1 | 4/2005 | Bassi et al. |
| 2005/0140720 A1 | 6/2005 | Silverbrook |
| 2008/0194881 A1 | 8/2008 | Marchionni et al. |
| 2011/0122195 A1* | 5/2011 | Kovacs et al. .................. 347/45 |

* cited by examiner

*Primary Examiner* — Matthew Luu
*Assistant Examiner* — Renee I Wilson
(74) *Attorney, Agent, or Firm* — Marger Johnson & McCollom PC (57) ABSTRACT

A coating for an ink jet printhead front face, wherein the coating comprises a oleophobic low adhesion coating. When the oleophobic low adhesion coating is disposed on an ink jet printhead front face surface, jetted drops of ultra-violet gel ink or jetted drops of solid ink exhibit a contact angle greater than 45° and a low sliding angle of less than about 30°. In embodiments, the oleophobic low adhesion coating is thermally stable wherein the surface contact angle and sliding angle show little degradation after the coating is subjected to high temperatures in a range between 180° and 320° or thereabout and high pressures in a range between 100 psi and 400 psi or thereabout during printhead fabrication and manufacturing.

18 Claims, 3 Drawing Sheets

THERMALLY STABLE OLEOPHOBIC LOW ADHESION COATING FOR INKJET PRINTHEAD FRONT FACE

CROSS-REFERENCE TO RELATED APPLICATIONS

Copending Application U.S. Ser. No. 13/337,089, filed Dec. 24, 2011, entitled "COATING FOR AN INK JET PRINTHEAD FRONT FACE," which is a continuation in part of Ser. No. 12/625,442, filed Nov. 24, 2009, now U.S. Pat. No. 8,226,207, the disclosure of which is incorporated herein by reference in its entirety.

BACKGROUND

Inkjet printers produce images by jetting or ejecting droplets of liquid ink from an inkjet printhead onto a recording substrate (e.g., paper). The printhead typically has a front face with a nozzle opening defined therein, through which liquid ink is ejected as droplets onto the recording substrate.

The front face of an inkjet printhead can become contaminated by wetting or drooling of ink. Such contamination can cause or contribute to partial or complete blocking of the nozzle opening within the front face of the inkjet printhead. This blocking can prevent ink droplets from being ejected from the inkjet printhead, cause under- or over-sized ink droplets to be ejected from the inkjet printhead, alter the intended trajectory of ejected ink droplets onto the recording substrate, and the like, all of which degrade the print quality of inkjet printers.

Figure 1:
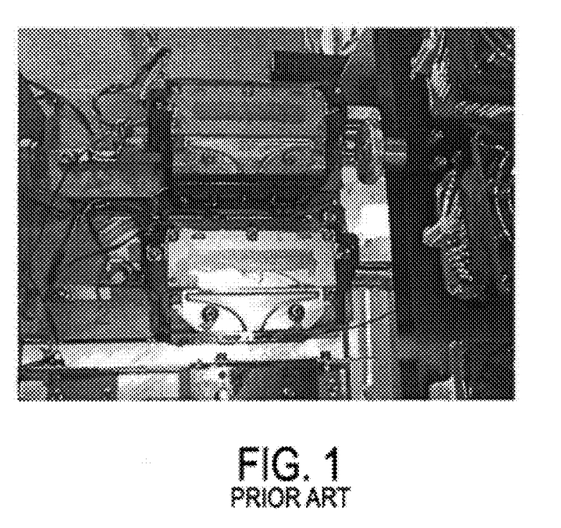
FIG. 1 is a photograph showing contamination of a UV gel ink over a nozzle area of a printhead front face having a polytetrafluoroethylene coating after a printing run.

The front face of an inkjet printhead is typically coated with a material such as polytetrafluoroethylene (PTFE) (e.g., Teflon®) or perfluoroalkoxy (PFA), to protect it. Current printheads like Maverick have good initial performance with Xerox solid ink. However over operational lifetime, the performance degrades and ink does not readily slide over printhead front face coatings at typical ink-ejecting temperatures. Rather, the ink tends to adhere and flow along the printhead front face coating, leaving a residual ink film which can partially or completely block the nozzle opening within the front face of the inkjet printhead. This problem is more severe with UV gel ink, with printhead failure due to drooling happening at initial stage itself. FIG. 1 is a photograph of the front face of an inkjet printhead after a printing run showing wetting and contamination of a UV-curable ink over most of the area of the front face surrounding nozzle openings. Hence oleophobic low adhesion coatings which prevent drooling failure are important to improve robustness and reliability, and enabling new market penetration for future UV gel ink.

Contamination of an inkjet printhead front face can be minimized somewhat by adopting purging and/or wiping procedures. However, these procedures can undesirably consume time and/or use excessive amounts of ink, thereby decreasing the useful life of the inkjet printhead. Contamination of an inkjet printhead front face can also be minimized somewhat by providing an oleophobic low adhesion printhead front face coating that does not wet significantly with ink ejected from nozzle openings of the printhead. When heated to temperatures typically encountered during printhead fabrication processes, however, the surface property characteristics of known oleophobic low adhesion printhead front face coatings degrade to the point that they cannot be relied upon to minimize contamination of the inkjet printhead front face.

DETAILED DESCRIPTION OF THE EMBODIMENTS

Described is an oleophobic low adhesion surface coating for an ink jet printhead front face, wherein the surface coating comprises an oleophobic low adhesion polymeric material. When the surface coating is disposed on an ink jet printhead front face surface, jetted drops of ultra-violet (UV) gel ink (also referred to herein as "UV ink") or jetted drops of solid ink exhibit low adhesion towards the surface coating. The adhesion of an ink drop towards a surface can be determined by measuring the sliding angle of the ink drop (i.e., the angle at which a surface is inclined relative to a horizontal position when the ink drop begins to slide over the surface without leaving residue or stain behind). The lower the sliding angle, the lower the adhesion between the ink drop and the surface. As used herein, the term "low adhesion" means a low sliding angle of less than about 30° when measured with ultra-violet curable gel ink or solid ink, with the printhead front face surface. In some embodiments, a low sliding angle is less than about 25° when measured with ultra-violet curable gel ink or solid ink, with the printhead front face surface. In some embodiments, a low sliding angle is less than about 20° when measured with ultra-violet curable gel ink or solid ink, with the printhead front face surface. In some embodiments, a low sliding angle is greater than 1° (or greater than about 1°) when measured with ultra-violet curable gel ink or solid ink, with the printhead front face surface. As used herein, an oleophobic low adhesion surface coating is "thermally stable" when drops of ultra-violet gel ink or solid ink exhibit low adhesion towards the surface coating after the surface coating has been exposed to high temperatures (e.g., temperatures in a range between 180° C. and 325° C., or in a range between about 180° C. and about 325° C.) and high pressures (e.g., pressures in a range between 100 psi and 400 psi, or in a range between about 100 psi and about 400 psi) for extended periods of time (e.g., periods of time in a range between 10 minutes and 2 hours, or in a range between about 10 minutes and about 2 hours). In one embodiment, the surface coating is thermally stable after the surface coating has been exposed to a temperature of 290° C. (or about 290° C.) at pressures of 300 psi (or about 300 psi) for 30 minutes (or about 30 minutes). Thus, the surface coating can be bonded to a stainless steel aperture brace at high temperature and high pressure without any degradation. Therefore the resulting printhead can prevent ink contamination because ink droplets can roll off the printhead front face, leaving behind no residue.

In some embodiments, a printing apparatus includes an ink jet printhead having a front face and an oleophobic low adhesion surface coating disposed on a surface of the front face. The oleophobic low adhesion surface coating includes an oleophobic low adhesion polymeric material configured such that jetted drops of ultra-violet gel ink or jetted drops of solid ink exhibit a contact angle greater than 45° (or greater than about 45°). In one embodiment, jetted drops of ultra-violet gel ink or jetted drops of solid ink exhibit a contact angle greater than 55° (or greater than about 55°). In another embodiment, jetted drops of ultra-violet gel ink or jetted drops of solid ink exhibit a contact angle greater than 65° (or greater than about 65°). In one embodiment, there is no upper limit to the contact angle exhibited between the jetted drops of ultra-violet gel ink or jetted drops of solid ink and the surface coating. In another embodiment, the jetted drops of ultra-violet gel ink or jetted drops of solid ink exhibit a contact angle less than 150° (or less than about 150°). In yet another embodiment, the jetted drops of ultra-violet gel ink or jetted drops of solid ink exhibit a contact angle less than 90° (or less than about 90°). When ink is filled into the printhead, it is desired to maintain the ink within the nozzle until it is time to eject the ink. Generally, the greater the ink contact angle the better (higher) the drool pressure. Drool pressure relates to the ability of the aperture plate to avoid ink weeping out of the nozzle opening when the pressure of the ink tank (reservoir) increases. In some embodiments, the coatings are thermally stable and provide this property even after exposure to high temperatures (e.g., temperatures in a range between 180° C. and 325° C., or in a range between about 180° C. and about 325° C.) and high pressures (e.g., pressures in a range between 100 psi and 400 psi, or in a range between about 100 psi and about 400 psi) for extended periods of time (e.g., periods of time in a range between 10 minutes and 2 hours, or in a range between about 10 minutes and about 2 hours), thereby maintaining high drool pressures. In one embodiment, the coatings are thermally stable and provide this property even after exposure to a temperature of 290° C. (or about 290° C.) at pressures of 300 psi (or about 300 psi) for 30 minutes (or about 30 minutes), thereby maintaining high drool pressures. Advantageously, the oleophobic low adhesion surface coatings described herein provide, in combination, low adhesion and high contact angle for ultra-violet curable gel ink and solid ink, which further provides the benefit of improved drool pressure or reduced or eliminated weeping of ink out of the nozzle.

In some embodiments, the oleophobic low adhesion surface coating is a reaction product of a reactant mixture that includes at least one isocyanate and a hydroxyl (e.g., alcohol) functionalized fluoro-crosslinking material. In one embodiment, the hydroxyl functionalized fluoro-crosslinking material is present within the reactant mixture in a range between about 30% by weight (or about 30% by weight) to 90% by weight (or about 90% by weight). The reaction product of an alcohol and an isocyanate can include a urethane (e.g., a polyurethane polymer). In one embodiment, the hydroxyl functionalized fluoro-crosslinking material includes at least one perfluoropolyether compound.

Suitable isocyanates include monomeric, oligomeric, and polymeric isocyanates, including (but are not limited to) those of the general formula $R_1-(NCO)_n$ wherein $R_1$ is an alkyl group, an alkylene group, an aryl group, an arylene group, an arylalkyl group, an arylalkylene group, an alkylaryl group or an alkylarylene group.

In one embodiment, $R_1$ is an alkyl or an alkylene group (including linear and branched, saturated and unsaturated, cyclic and acyclic, and substituted and unsubstituted alkyl and alkylene groups, and wherein heteroatoms, such as oxygen, nitrogen, sulfur, silicon, phosphorus, or the like either may or may not be present in the alkyl or alkylene group). In one embodiment, the alkyl or alkylene group has at least about 8 carbon atoms. In another embodiment, the alkyl or alkylene group has at least about 10 carbon atoms. In another embodiment, the alkyl or alkylene group has at least about 12 carbon atoms. In one embodiment, the alkyl or alkylene group has no more than about 60 carbon atoms. In another embodiment, the alkyl or alkylene group has no more than about 50 carbon atoms. In yet another embodiment, the alkyl or alkylene group has no more than about 40 carbon atoms. It will be appreciated, however, that the number of carbon atoms can be outside of these ranges.

In one embodiment, $R_1$ is an aryl or an arylene group (including substituted and unsubstituted aryl and arylene groups, and wherein heteroatoms, such as oxygen, nitrogen, sulfur, silicon, phosphorus, or the like either may or may not be present in the aryl or arylene group). In one embodiment, the aryl or arylene group has at least about 5 carbon atoms. In another embodiment, the aryl or arylene group has at least about 6 carbon atoms. In one embodiment, the aryl or arylene group has no more than about 50 carbon atoms. In another embodiment, the aryl or arylene group has no more than about 25 carbon atoms. In yet another embodiment, the aryl or arylene group has no more than about 12 carbon atoms. It will be appreciated, however, that the number of carbon atoms can be outside of these ranges.

In one embodiment, $R_1$ is an arylalkyl or an arylalkylene group (including substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein heteroatoms, such as oxygen, nitrogen, sulfur, silicon, phosphorus, or the like either may or may not be present in either the aryl or the alkyl portion of the arylalkyl or arylalkylene group). In one embodiment, the arylalkyl or arylalkylene group has at least about 6 carbon atoms. In another embodiment, the arylalkyl or arylalkylene group has at least about 7 carbon atoms. In one embodiment, the arylalkyl or arylalkylene group has no more than about 60 carbon atoms. In another embodiment, the arylalkyl or arylalkylene group has no more than about 40 carbon atoms. In yet another embodiment, the arylalkyl or arylalkylene group has no more than about 30 carbon atoms. It will be appreciated, however, that the number of carbon atoms can be outside of these ranges.

The substituents on the substituted alkyl, alkylene, aryl, arylene, arylalkyl, arylalkylene, alkylaryl, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, or the like, wherein two or more substituents can be joined together to form a ring, and n is an integer representing the number of isocyanate groups, being, for example, 1, 2, 3, or the like in the instance of monomeric isocyanates and having no necessary upper limit in the case of polymeric isocyanates.

Examples of diisocyanates include isophorone diisocyanate (IPDI), of the formula 2,4-toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), of the formula:

naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; 2,2,4-trimethylhexamethylene diisocyanate and 2,4,4-trimethylhexamethylene diisocyanate, of the formulae:

tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; or the like, as well as mixtures thereof. Examples of triisocyanates or their equivalents include triphenyl methane-4,4',4"-triisocynate; Tris(p-isocynatophenyl) thiophosphate; trimethylolpropane trimer of TDI, or the like, isocyanurate trimers of TDI, HDI, IPDI, or the like, and biuret trimers of TDI, HDI, IPDI, or the like, as well as mixtures thereof. Examples of higher isocyanate functionalities include copolymers of TDI/HDI, or the like, and MDI oligomers, as well as mixtures thereof. In some embodiments, the isocyanate moiety can be allophanate modified MDI or polymers of allophanate modified MDI. In some embodiments, the isocynate moiety can also be a (per)fluoropolyethereal prepolymer having polyisocyanic functionality as described in prior art (U.S. Pat. No. 4,863,986; U.S. Pat. No. 4,704,420; U.S. Pat. No. 6,071,564), and previously available commercially as Fluorobase-Z. In some embodiments, suitable isocyanates may be obtained under the name Desmodur® Mondur® or Impranil® for example, Desmodur N 3300®, Desmodur N 3790®, available from Bayer Materials Science, or the like or mixtures thereof.

Suitable perfluoropolyether compounds include mono- or di-hydroxyl functionalized monomeric, oligomeric, and polymeric perfluoropolyether compounds. Examples of suitable dihydroxy functionalized perfluoropolyether compounds include (but are not limited to) those of the general formula:

wherein a is an integer in a range between 0 and 20, and b and c are integers in a range between 0-50, provided that at least one of b and c are not zero. In one embodiment, a suitable di-functionalized perfluoropolyether compound can be represented by the formula:

In some embodiments, suitable dihydroxy functionalized perfluoropolyether compounds may be obtained under the name Fluorolink®, for example, Fluorolink D®, Fluorolink D10®, Fluorolink D10H®, Fluorolink E10®, Fluorolink E10H®, available from Solvay Solexis, or the like or mixtures thereof.

Any suitable reaction conditions for making urethane compounds, or the like, or mixtures thereof, by condensing one or more of the perfluoropolyether compounds with one or more of the isocyanates can be used to prepare the polymer of the oleophobic low adhesion printhead front face coating. Typically (although not necessarily), the reaction can be carried out at various temperatures (for example, from about 25° C. to about 160° C.) in the presence of an optional reaction catalyst, such as dibutyltin dilaurate, bismuth tris-neodecanoate, cobalt benzoate, lithium acetate, stannous octoate, triethylamine, or the like. Other exemplary catalysts include RC catalysts from Rheine Chemie.

The mole ratio of reactants can be adjusted so that the isocyanate functionalities are completely consumed in the reaction with a slight molar excess of alcohol. The reactants can be added together in any order and/or added to the reaction as physical mixtures. If desired, reaction conditions and the order of the addition of reactants can be controlled for several reasons, such as to provide a controlled exothermic reaction, to tailor the distribution of molecules when reacting a diisocyanate with a mixture of an alcohol or the like.

When doing these adjustments, the different reactivities to isocyanates of alcohols versus amines can be employed, as well as the different reactivities of the two separate isocyanate groups on diisocyanates such as isophorone diisocyanate. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, the disclosures of each of which are incorporated herein by reference in their entireties, which provide further explanation of this chemistry. By so tailoring the distribution of molecules, one can control the finished product to have a controlled viscosity that is designed for a specific application, have a controlled glass transition temperature and/or melting point, have consistent properties from batch to batch, or the like.

In one embodiment, the reaction conditions can be conducted in an inert atmosphere, such as argon or nitrogen gas or other suitable gases, to prevent oxidizing or yellowing of the reaction products and to prevent undesirable side reactions due to moisture. The reaction can be performed neat (i.e., without a solvent) or can optionally employ any desired or effective solvent. Examples of suitable solvents include xylene, toluene, benzene, chlorobenzene, nitrobenzene, dichlorobenzene, N-methylpyrrolidinone, dimethyl formamide, dimethyl sulfoxide, sulfolane, hexane, tetrahydrofuran, butyl acetate, amyl acetate, HFE 7200 (3M), HFE 7500 (3M), Solvosol (Dow) and the like, as well as mixtures thereof. Another exemplary solvent that may be used is FCL 52 solvent, available from Cytonix LLC.

Reactions wherein isocyanates are reacted with compounds such as alcohols are also disclosed in, for example, U.S. Patent App. Pub. No. 2004/0077887, U.S. Pat. No. 6,821,327, U.S. Patent App. Pub. No. 2004/0082801, U.S. Patent App. Pub. No. 2004/0167249, and U.S. Ser. No. 10/918,053, and 10/918,619, the disclosures of each of which are incorporated herein by reference in their entireties.

The oleophobic low adhesion surface coating disclosed herein can be employed as an anti-wetting printhead front face coating for an inkjet printhead configured to eject ink onto a recording substrate. Any suitable recording substrate may be employed, including plain papers such as XEROX® 4024 papers, XEROX® Image Series papers, Courtland 4024

DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

In some embodiments, the printhead comprises a front face having disposed on a surface thereof an oleophobic low adhesion coating comprising an oleophobic low adhesion polymeric material wherein jetted drops of ultra-violet gel ink or jetted drops of solid ink exhibit a contact angle with the surface coating that is greater than 45° (or greater than about 45°). In some embodiments, the contact angle is greater than 55° (or greater than about 55°). In some embodiments, the contact angle is greater than 65° (or greater than about 65°). In one embodiment, there is no upper limit to the contact angle exhibited between the jetted drops of ultra-violet gel ink or jetted drops of solid ink and the surface coating. In another embodiment, the contact angle is less than 150° (or less than about 150°). In another embodiment, the contact angle less than 90° (or less than about 90°). The greater the ink contact angle the higher the drool pressure. Drool pressure relates to the ability of the aperture plate to avoid ink weeping out of the nozzle when the pressure of the ink tank (reservoir) increases. In some embodiments, the coatings provide, in combination, low adhesion and high contact angle for ultra-violet curable gel ink and solid ink which advantageously affects the drool pressure. In some embodiments, the coatings herein provide a low sliding angle of less than 30° (or less than about 30°). In some embodiments, the sliding angle is less than 25° (or less than about 25°). In some embodiments, the sliding angle is greater than 1° (or greater than about 1°). Contact angle is largely insensitive to drop size. However, contact angle can be measured upon disposing 5-10 microliter drops of UV ink or solid ink onto the surface coating. Sliding angle can be measured upon disposing 7-12 microliter drops of UV ink or solid ink onto the surface coating.

In embodiments described herein, the oleophobic low adhesion coatings are thermally stable, thereby providing a low sliding angle in a range between 1° and 30° (or in a range between about 1° and 30°) and a high contact angle in a range between 45° and 150° (or in a range between about 45° and about 150°) even after exposure to high temperatures (e.g., temperatures in a range between 180° C. and 325° C., or in a range between about 180° C. and about 325° C.) and high pressures (e.g., pressures in a range between 100 psi and 400 psi, or in a range between about 100 psi and about 400 psi) for extended periods of time (e.g., periods of time in a range between 10 minutes and 2 hours, or in a range between about 10 minutes and about 2 hours). In one embodiment, the oleophobic low adhesion coating is thermally stable after being exposed to a temperature of 290° C. (or about 290° C.) at pressures of 300 psi (or about 300 psi) for 30 minutes (or about 30 minutes). The fabrication of high density Piezo printheads requires a high temperature, high pressure adhesive bonding step. Hence, it would be desirable for a frontface coating to withstand these high temperature and high pressure conditions. The stability of the oleophobic low adhesion surface coating described herein at high temperatures and high pressures is compatible with current printhead manufacturing processes.

When coated onto the front face of an inkjet printhead, the oleophobic low adhesion surface coating exhibits a sufficiently low adhesion with respect to the inks that are ejected from the inkjet printhead such that ink droplets remaining on the oleophobic low adhesion coating can slide off the printhead in a simple, self-cleaning manner. Contaminants such as dust, paper particles, etc., which are sometimes found on the front face of inkjet printheads, can be carried away from the inkjet printhead front face by a sliding ink droplet. Thus, the oleophobic low adhesion printhead front face coating can provide a self-cleaning, contamination-free inkjet printhead.

As used herein, the oleophobic low adhesion coating can exhibit a "sufficiently low wettability" with respect to inks that are ejected from an inkjet printhead when a contact angle between an ink and the oleophobic low adhesion coating is, in one embodiment, greater than about 45° and in another embodiment greater than about 55°.

The oleophobic low adhesion coating disclosed herein can be employed as an oleophobic low adhesion printhead front face coating for an inkjet printhead of any suitable inkjet printer (e.g., continuous inkjet printers, thermal drop-on-demand (DOD) inkjet printers, and piezoeletric DOD inkjet printers). As used herein, the term "printer" encompasses any apparatus, such as a digital copier, bookmaking machine, facsimile machine, multi-function machine, and the like, which performs a print outputting function for any purpose.

The oleophobic low adhesion coating disclosed herein can be employed as an oleophobic low adhesion printhead front face coating for an inkjet printhead configured to eject any suitable ink (e.g., aqueous inks, solvent inks, UV-curable inks, dye sublimation inks, solid inks, etc.). An exemplary inkjet printhead suitable for use with the oleophobic low adhesion coating disclosed herein is described with respect to FIG. 2.

Figure 2:
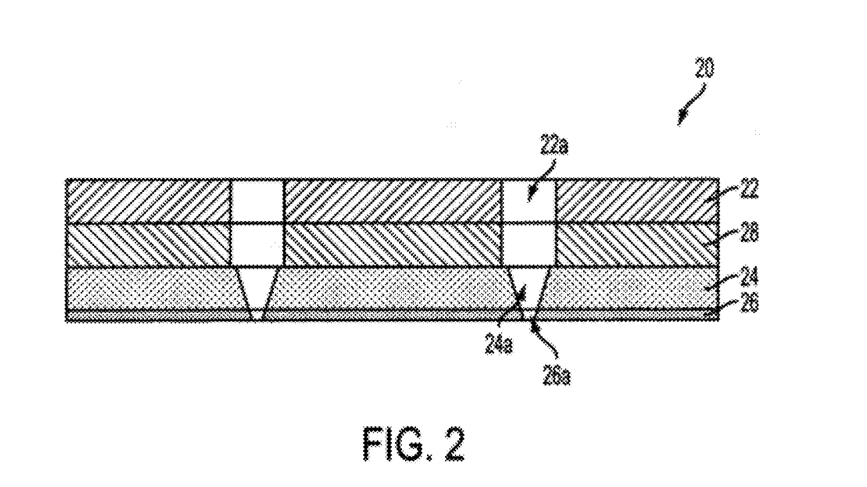
FIG. 2 is a sectional view of an inkjet printhead according to some embodiments of the present invention.

Referring to FIG. 2, an inkjet printhead 20 according to one embodiment of the present invention includes a support brace 22, a nozzle plate 24 bonded to the support brace 22 and an oleophobic low adhesion coating, such as oleophobic low adhesion coating 26.

The support brace 22 is formed of any suitable material such as stainless steel and include apertures 22a defined therein. The apertures 22a may communicate with an ink source (not shown). The nozzle plate 24 may be formed of any suitable material such as polyimide and include nozzles 24a defined therein. The nozzles 24a may communicate with the ink source via the apertures 22a such that ink from the ink source is jettable from the printhead 20 onto a recording substrate through a nozzle 24a.

In the illustrated embodiment, the nozzle plate 24 is bonded to the support brace 22 by an intervening adhesive material 28. The adhesive material 28 may be provided as a thermoplastic adhesive can be melted during a bonding process to bond the nozzle plate 24 to the support brace 22. Typically, the nozzle plate 24 and the oleophobic low adhesion coating 26 are also heated during the bonding process. Depending on the material from which the thermoplastic adhesive is formed, bonding temperature can be in a range between 180° C. and 325° C. (or in a range between about 180° C. and about 325° C.).

Conventional oleophobic low adhesion coatings tend to degrade when exposed to temperatures encountered during typical bonding processes or other high-temperature, high pressure processes encountered during fabrication of inkjet printheads. However, the oleophobic low adhesion coating 26 disclosed herein exhibits a sufficiently low adhesion (indicated by low sliding angles) and high contact angle with respect to an ink after it has been heated to the bonding temperature. Thus, the oleophobic low adhesion coating 26 can provide a self-cleaning, contamination-free inkjet printhead 20 with high drool pressure. The ability of the oleophobic low adhesion coating 26 to resist substantial degradation in desirable surface properties (e.g., including low sliding angle and high contact angle) upon exposure to elevated temperatures enables inkjet printheads having self-cleaning abilities while maintaining high drool pressure, to be fabricated using high-temperature and high pressure processes. An exemplary process of forming an inkjet printhead is described with respect to FIGS. 2-5.

Figure 3:
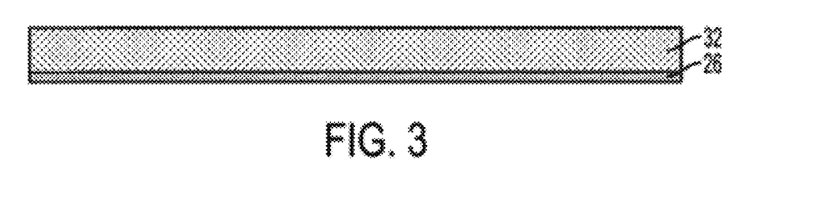
FIGS. 3-5 illustrate a process of forming the inkjet printhead shown in FIG. 2, according to one embodiment of the present invention.

Referring to FIG. 3, an inkjet printhead, such as the inkjet printhead 20, may be formed by forming an oleophobic low adhesion coating, such as oleophobic low adhesion coating 26 on a substrate 32. The substrate 32 may be formed of any suitable material such as polyimide.

In one embodiment, the oleophobic low adhesion coating 26 may be formed on the substrate 32 by initially applying the reactant mixture that, as described above, includes at least one isocyanate and at least one perfluoropolyether compound. After the reactant mixture is applied to the substrate 32, the reactants are reacted together to form the oleophobic low adhesion coating 26. The reactants can be reacted together by, for example, curing the reactant mixture. In one embodiment, the reactant mixture is first cured at a temperature of about 130° C. for about 30 minutes to 2 hours followed by a high temperature post-cure at about 290° C. for about 30 minutes to 2 hours.

In one embodiment, the reactant mixture may be applied to the substrate 32 using any suitable method such as die extrusion coating, dip coating, spray coating, spin coating, flow coating, stamp printing, and blade techniques. An air atomization device such as an air brush or an automated air/liquid spray can be used to spray the reactant mixture. The air atomization device can be mounted on an automated reciprocator that moves in a uniform pattern to cover the surface of the substrate 32 with a uniform (or substantially uniform) amount of the reactant mixture. The use of a doctor blade is another technique that can be employed to apply the reactant mixture. In flow coating, a programmable dispenser is used to apply the reactant mixture.

Figure 4:
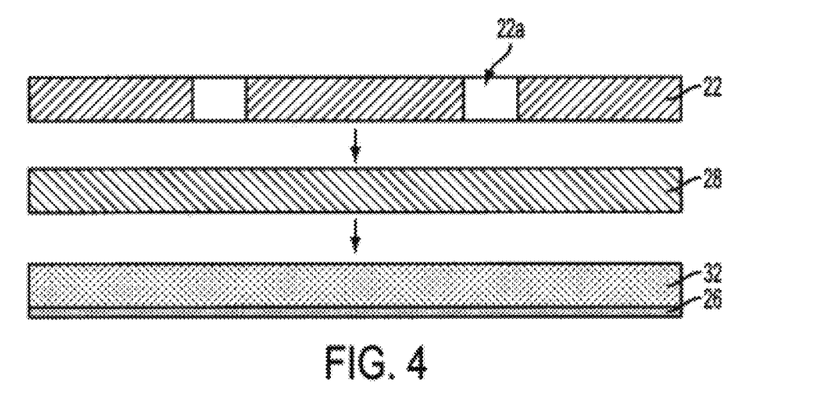
Figure 5:
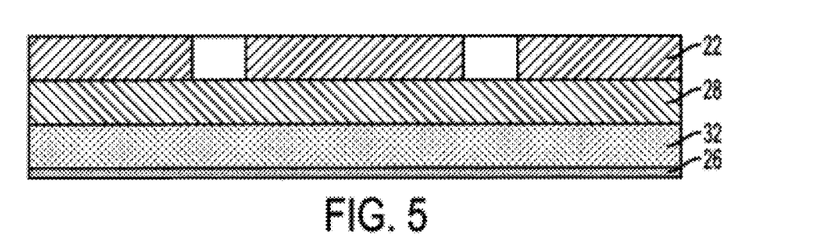

Referring to FIG. 4, the substrate 32 is bonded to the aperture brace 22 via adhesive material 28, resulting in the structure shown in FIG. 5. In one embodiment, the adhesive material 28 is bonded to the aperture brace 22 before being bonded to the substrate 32. In another embodiment, the adhesive material 28 is bonded to the substrate 32 before being bonded to the aperture brace 22. In yet another embodiment, the adhesive material 28 is bonded to the substrate 32 and the aperture brace 22 simultaneously.

In embodiments where the adhesive material 28 is provided as a thermoplastic adhesive, the adhesive material 28 is bonded to the substrate 32 and the aperture brace 22 by melting the thermoplastic adhesive at, and subjecting the oleophobic low adhesion coating 26 to, a bonding temperature and a bonding pressure. In one embodiment, the bonding temperature is at least about 290° C. In one embodiment, the bonding temperature can be at least about 310° C. In another embodiment, the bonding temperature can be at least about 325° C. In one embodiment, the bonding pressure is at least about 100 psi. In one embodiment, the bonding pressure can be at least about 300 psi.

After bonding the substrate 32 to the aperture brace 22, the aperture brace 22 may be used as a mask during one or more patterning processes to extend the apertures 22a into the adhesive material 28, as shown in FIG. 2. The aperture brace 22 may also be used as a mask during one or more patterning processes to form nozzles 24a in the substrate 32, thereby forming the nozzle plate 24 shown in FIG. 2. The one or more patterning processes used to form nozzles 24a may also be applied to form nozzle openings 26a within the oleophobic low adhesion coating 26, wherein the nozzle openings 26a communicate with the nozzles 24a. In one embodiment, the apertures 22a may be extended into the adhesive material 28 by a laser ablation patterning process, or the like. In one embodiment, the nozzles 24a and nozzle openings 26a may be formed in the substrate 32 and the oleophobic low adhesion coating 26, respectively, by a laser ablation patterning process, or the like.

Specific embodiments will now be described in detail. These examples are intended to be illustrative, and the claims are not limited to the materials, conditions, or process parameters set forth in these embodiments.

EXAMPLES

Example 1

5.5 grams of Fluorolink-D (from Solvay-Solexis), 1.5 grams of Desmodur 3300, 1.0 grams of Desmodur 3790 (from Bayer), 0.05 grams of RC catalysts and 85 mL FCL52 solvent (from Cytonix) were mixed in a beaker. The contents were stirred for 30 minutes at 25° C. and were then coated on polyimide substrate using drawbar coater. The coating was subjected to a first curing treatment in an oven at a temperature of 130° C. for 30 min. Subsequently, the coating was subjected to a second curing treatment in a furnace by ramping up the temperature at a rate of 5° C./min from room temperature to 290° C. and then remained at 290° C. for 30 min, thereby forming Coating 1. Contact angle and sliding angle of the coating were determined on an OCA20 goniometer from Dataphysics, which consists of a computer-controlled automatic liquid deposition system, computer-controlled tilting base unit (TBU90E) and a computer-based image processing system.

In a typical static contact angle measurement, about 5 microliters of hexadecane or about 3 microliter of UV ink (at typical ink jetting temperature of 80° C.), and 1 microliter solid ink (at typical ink jetting temperature of 115° C.) were gently deposited on the surface of the coating and the static angle was determined by the computer software (SCA20) and each reported data is an average of >5 independent measurements.

Sliding angle measurement was done by tilting the base unit at a rate of 1°/sec with an about 10 microliter droplet for hexadecane, UV ink (at typical ink jetting temperature of 80° C.) and solid ink (at typical ink jetting temperature of 115° C.), using titling base unit TBU90E. The sliding angle is defined as the inclination angle of a coated polyimide substrate at which the test drops (hexadecane, UV ink or solid ink) began to slide off the coated polyimide substrate without leaving residue or stain behind.

Table 1 below summarizes the contact angle and sliding angle data for the coating prepared according to Example 1.

TABLE 1

| Coating | Solid Ink Contact Angle (Sliding Angle) | UV Ink Contact Angle (Sliding Angle) | Hexadecane Contact Angle (Sliding Angle) |
|---|---|---|---|
| 1 | 78.3° (2.0°) | 61.0° (4.0°) | 68.1° (7°) |

Example 2

4.5 grams of Fluorolink-D (from Solvay-Solexis), 1.5 grams of Desmodur 3300, 1.0 grams of Desmodur 3790 (from Bayer), 0.05 grams of RC catalysts and 85 mL FCL52 solvent (from Cytonix) were mixed in a beaker. The contents were stirred for 30 minutes at 25° C. and were then coated on polyimide substrate using drawbar coater. The coating was subjected to the first and second curing treatments described in Example 1, thereby forming Coating 2. The contact angle and the sliding angle of the coated film were determined, again using the procedure described in Example 1. Table 2 below summarizes the contact angle and sliding angle data for the coating prepared according to Example 2.

TABLE 2

| Coating | Solid Ink Contact Angle (Sliding Angle) | UV Ink Contact Angle (Sliding Angle) | Hexadecane Contact Angle (Sliding Angle) |
| --- | --- | --- | --- |
| 2 | 76.0° (3.0°) | 62.3° (7.0°) | 67.0° (7.5°) |

Example 3

6.5 grams of Fluorolink-D (from Solvay-Solexis), 1.5 grams of Desmodur 3300, 1.0 grams of Desmodur 3790 (from Bayer), 0.05 grams of RC catalysts and 85 mL FCL52 solvent (from Cytonix) were mixed in a beaker. The contents were stirred for 30 minutes at 25° C. and were then coated on polyimide substrate using drawbar coater. The coating was subjected to the first and second curing treatments described in Example 1, thereby forming Coating 3. The contact angle and the sliding angle of the coating were determined, again using the procedure described in Example 1. Table 3 below summarizes the contact angle and sliding angle data for the coating prepared according to Example 3.

TABLE 3

| Coating | Solid Ink Contact Angle (Sliding Angle) | UV Ink Contact Angle (Sliding Angle) | Hexadecane Contact Angle (Sliding Angle) |
| --- | --- | --- | --- |
| 3 | 72.0° (2.0°) | 61.8° (9.5°) | 66.0° (9.0°) |

Example 4

In Example 4, Coating 4 was prepared according to the procedures described in Example 1, Coating 5 was prepared according to the procedures described in Example 2, and Coating 6 was prepared according to the procedures described in Example 3. However, Coatings 4, 5 and 6 were only subjected to the first curing treatment described in Example 1. The surface properties of Coatings 4, 5 and 6 were determined by contact angle measurements according to the procedures described in Example 1. Table 4 below summarizes the contact angle and sliding angle data for the coatings prepared according to Example 4.

TABLE 4

| Coating | Solid Ink Contact Angle (Sliding Angle) | UV Ink Contact Angle (Sliding Angle) | Hexadecane Contact Angle (Sliding Angle) |
| --- | --- | --- | --- |
| 4 | 82.6° (7.6°) | 62.7° (10.3°) | 68.1° (7.8°) |
| 5 | 80.1° (8.5°) | 59.7° (11.3°) | 66.1° (8.3°) |
| 6 | 79.5° (6.3°) | 60.1° (8.9°) | 65.7° (9.3°) |

Example 5

Comparative Example

A stainless steel printhead was prepared using the process described in U.S. Pat. No. 5,867,189. The aperture plate was coated with PFA using an E-Beam sputtering technique, thereby forming Coating 7. The contact angle and sliding angle of Coating 7 were determined according to the procedure in Example 1, and the data are summarized in Table 5. Comparatively, the contact angle for Coating 7 is similar to those of Coatings 1-3; however, the sliding angle for Coating 7 is significantly larger than the sliding angles of Coatings 1-3. Low sliding angles translate to low adhesion between the ink drops and the coating surface whereas how sliding angles translate to high adhesion between the ink drops and the coating surface.

TABLE 5

| Coating | Solid Ink Contact Angle (Sliding Angle) | UV Ink Contact Angle (Sliding Angle) |
| --- | --- | --- |
| 7 (PFA) | 85.0° (~70°) | 63.0° (flowing leaving ink residue) |

Example 6

Ink aging experiments were performed by soaking coating 1 and coating 4 in a mixture of molten cyan, magenta, yellow and black ink at 140° C. for 2 days. The contact angle and sliding angle, both before and after ink aging, were determined. The contact angle and sliding angle data are summarized in Table 6. The data show that coating fabricated with the procedure in Example 1 is more robust against ink aging. In Example 1, coating 1 was post-cured at 290° C. for half an hour to 2 hours, whereas coating 4 was only cured at 130° C. for half an hour.

TABLE 6

| | Solid Ink Contact Angle (Sliding Angle) | |
| --- | --- | --- |
| Coating | T = 0 | T = 2 days |
| 1 | 78.3° (2.0°) | 73.5° (6.7°) |
| 4 | 82.6° (7.6°) | 68.7° (28.5° with beads left) |

Example 7

Figure 6:
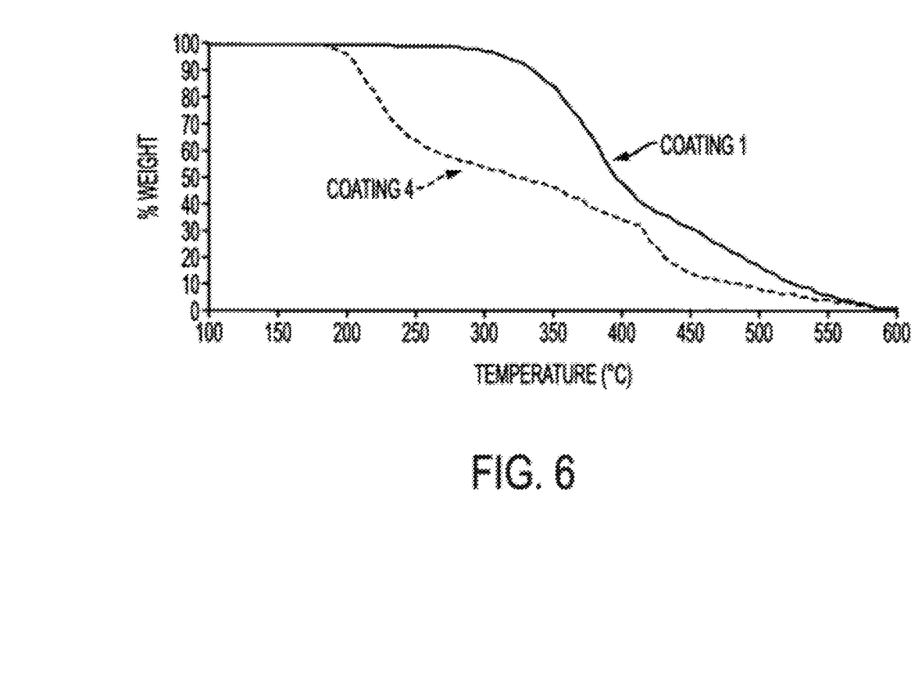
FIG. 6 illustrates a graph of % weight loss versus temperature for oleophobic low adhesion coatings.

Thermogravimetric analysis (TGA) was carried out for coatings 1 and 4. Coatings 1 and 4 were weighted into tared platinum pans and tested in oxidative (air) environments using a TA TGA Q500 instrument. The samples were equilibrated at 45° C. for 10 minutes and were then heated at 10° C. per minute under air flow of 25 ml/min. Weight loss profiles versus temperatures were recorded and are given in the graph illustrated in FIG. 6. As shown in FIG. 6, coating 1 had a decomposition onset temperature of 315° C. with only 2% weight loss between 30° C.-300° C. This indicated that the coating 1 has good thermal stability. In contrast, coating 4 had a decomposition onset temperature of 200° C. with 47% weight loss between 30-300° C., indicating poor thermal stability.

Example 8

In offline tests simulating adhesive bonding step of printhead fabrication, coatings 1 and 4 were subjected to a high pressure and high temperature bonding step, e.g., at 290° C. at 300 psi for 30 min. The contact angle and sliding angle, both before and after the bonding step, were determined. The contact angle and sliding angle data are summarized in Table 8. The contact angle and sliding angle of Coating 1 was found to be unchanged whereas degradation was observed for Coating 4.

TABLE 8

| Coating | Solid Ink Contact Angle (Sliding Angle) | |
|---|---|---|
| | Before bonding | After bonding |
| 1 | 78.3° (2.0°) | 78.2° (3.1°) |
| 4 | 82.6° (7.6°) | 63.0° (~40° with beads left) |

Example 9

Fabrication of Printhead Using Oleophobic Low Adhesion Coating According to Embodiments Disclosed Herein An array of nozzles were first fabricated on the low adhesion coating coated polyimide film, such as Coating 1 in Example 1, using the laser ablation technique. The polyimide film is then aligned to a stainless steel aperture brace and bonded onto it using a high temperature adhesive at 290° C. under 300 psi for half an hour. The resulting aperture assembly which includes aperture plate with the low adhesion coating, coating 1, was then attached and bonded to the jet stack/PZT assembly and manifold, resulting in a printhead. The front face of the resulting printhead exhibits surface properties identical to those of Coating 1.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A coating for an ink jet printhead front face, wherein the coating comprises:
   an oleophobic low adhesion coating, wherein a drop of ultra-violet (UV) gel ink or a drop of solid ink exhibits a sliding angle of less than about 30° with a surface of the coating after the coating has been exposed to a temperature of at least 200° C. for at least 30 minutes.

2. The coating of claim 1, wherein the sliding angle of less than about 20°.

3. The coating of claim 1, wherein a drop of UV gel ink or a drop of solid ink exhibits a contact angle of greater than about 45° with the surface of the oleophobic low adhesion coating after the oleophobic low adhesion coating has been exposed to the temperature for at least 30 minutes.

4. The coating of claim 1, wherein the contact angle is greater than about 55°.

5. The coating of claim 1, wherein a drop of UV gel ink or a drop of solid ink exhibits a sliding angle of less than 30° with a surface of the oleophobic low adhesion coating and a contact angle of greater than 45° with the surface of the oleophobic low adhesion coating after the coating has been exposed to:
   a first curing treatment at a temperature in a range between 130° C. and 150° C. for a period of time in a range between 30 minutes and 2 hours; and
   a second curing treatment at a temperature in a range between 250° C. and 330° C. for a period of time in a range between 30 minutes and 2 hours.

6. The coating of claim 1, wherein a drop of UV gel ink or a drop of solid ink exhibits a sliding angle of less than 30° with a surface of the oleophobic low adhesion coating and a contact angle of greater than 45° with the surface of the oleophobic low adhesion coating after the coating has been soaked in molten solid ink or UV gel ink at a temperature in a range between 120° C. and 150° for 2 days.

7. The coating of claim 1, wherein a drop of UV gel ink or a drop of solid ink exhibits a sliding angle of less than 30° with a surface of the oleophobic low adhesion coating and a contact angle of greater than 45° with the surface of the oleophobic low adhesion coating after the coating was exposed to the temperature at a pressure of at least 100 psi.

8. The coating of claim 7, wherein a drop of UV gel ink or a drop of solid ink exhibits a sliding angle of less than 30° with a surface of the oleophobic low adhesion coating and a contact angle of greater than 45° with the surface of the oleophobic low adhesion coating after the coating was exposed to a temperature less than 330° C. at a pressure of less than 400 psi.

9. The coating of claim 1, wherein the oleophobic low adhesion coating comprises:
   a first isocyanate compound; and
   a hydroxyl functionalized fluoro-crosslinking material.

10. The coating of claim 9, wherein the first isocyanate compound is at least one selected from the group consisting of diphenylmethane diisocyanate (MDI), toluene diisocyanate (TDI), hexamethylene diisocyanate (HDI), isophorone diisocyanate (IPDI), hydrogenated MDI, tetra-methyl xylene diisocyanate, naphthalene diisocyanate, cyclohexylene diisocyanate, trimethylhexamethylene diisocyanate, bis(4-isocyanatocyclohexyl) methane, uretidione dimers of monomeric diisocynates of one or more of HDI, IPDI, TDI and MDI, cyclotrimerized isocyanurates of monomeric diisocynates of one or more of HDI, IPDI and TDI, suitable oligomers, polymers or copolymers containing isocyanate (—NCO) functional groups, and a mixture thereof.

11. The coating of claim 9, wherein the hydroxyl functionalized fluoro-crosslinking material comprises at least one dihydroxy perfluoropolyether compound.

12. The coating of claim 9, wherein the oleophobic low adhesion coating further comprises a second isocyanate compound different from the first isocyanate compound.

13. The coating of claim 12, wherein the second isocyanate compound is at least one selected from the group consisting of diphenylmethane diisocyanate (MDI), toluene diisocyanate (TDI), hexamethylene diisocyanate (HDI), isophorone diisocyanate (IPDI), hydrogenated MDI, tetra-methyl xylene diisocyanate, naphthalene diisocyanate, cyclohexylene diisocyanate, trimethylhexamethylene diisocyanate, bis(4-isocyanatocyclohexyl) methane, uretidione dimers of monomeric diisocynates of one or more of HDI, IPDI, TDI and MDI, cyclotrimerized isocyanurate of monomeric diisocynates of one of more of HDI, IPDI and TDI, suitable oligomers, polymers or copolymers containing isocyanate (—NCO) functional groups, and a mixture thereof.

14. A process of forming an oleophobic low adhesion coating for an ink jet printhead front face, comprising:
   coating a reactant mixture comprising a first isocyanate compound and a hydroxyl functionalized fluoro-crosslinking material onto a substrate;

subjecting the coated reactant mixture to a first curing treatment at a first temperature; and thereafter, subjecting the coated reactant mixture to a second curing treatment at a second temperature higher than the first temperature.

15. The process of claim 14, wherein the hydroxyl functionalized fluoro-crosslinking material is present within the reactant mixture in a range between about 30% by weight to about 90% by weight.

16. The process of claim 14, wherein the first temperature is 130° C.

17. The process of claim 16, wherein the second temperature is 290° C.

18. An oleophobic low adhesion coating for an ink jet printhead front face formed according to the process of claim 14, wherein a drop of ultra-violet (UV) gel ink or a drop of solid ink exhibits a sliding angle of less than about 30° with a surface of the oleophobic low adhesion coating and exhibits a contact angle of greater than about 45° with the surface of the oleophobic low adhesion coating after the coating has been exposed to a temperature of at least 200° C. for at least 30 minutes.

* * * * *